(12) United States Patent  (10) Patent No.: US 8,696,248 B2
Lynderup et al.  (45) Date of Patent: Apr. 15, 2014

(54) METHOD AND DEVICE FOR DRIVING A MULTIPLICITY OF PILES INTO A SEABED

(75) Inventors: Henrik Fomsgaard Lynderup, Skals (DK); Thomas Oestergaard, Kolding (DK)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 13/613,754

(22) Filed: Sep. 13, 2012

(65) Prior Publication Data

US 2013/0243532 A1   Sep. 19, 2013

(30) Foreign Application Priority Data

Sep. 30, 2011  (EP) ..................................... 11183464

(51) Int. Cl.
*E02D 13/04* (2006.01)
(52) U.S. Cl.
USPC ........................................ 405/227; 405/228
(58) Field of Classification Search
USPC ........................................ 405/224, 227, 228
See application file for complete search history.

(56) References Cited

U.S. PATENT DOCUMENTS

| 2,651,181 | A | * | 9/1953 | Alcorn et al. | 405/227 |
|---|---|---|---|---|---|
| 3,572,044 | A | * | 3/1971 | Pogonowski | 405/204 |
| 4,131,166 | A | | 12/1978 | Schnell | |
| 4,435,108 | A | * | 3/1984 | Hampton | 405/227 |
| 4,589,802 | A | * | 5/1986 | Hampton | 405/227 |
| 4,687,062 | A | * | 8/1987 | Beghetto et al. | 405/227 |
| 4,822,212 | A | * | 4/1989 | Hall et al. | 405/227 |
| 4,904,119 | A | | 2/1990 | Legendre et al. | |
| 5,228,806 | A | * | 7/1993 | De Medieros et al. | 405/228 |
| 6,354,767 | B1 | * | 3/2002 | Jones | 405/228 |
| 7,585,133 | B2 | * | 9/2009 | Jones | 405/228 |
| 2010/0119309 | A1 | * | 5/2010 | Gibberd | 405/228 |
| 2011/0170956 | A1 | | 7/2011 | Vandenbulcke et al. | |

FOREIGN PATENT DOCUMENTS

| EP | 59648 | A1 | * | 9/1982 | ............. E02D 29/06 |
|---|---|---|---|---|---|
| EP | 0699803 | A1 | | 3/1996 | |
| EP | 1621677 | A1 | | 2/2006 | |
| GB | 2054710 | A | * | 2/1981 | ............. E02B 17/02 |
| GB | 2448358 | A | | 10/2008 | |
| GB | 2469190 | A | | 10/2010 | |

OTHER PUBLICATIONS

MENCK Hydraulic Hammers, company brochure.

* cited by examiner

*Primary Examiner* — Frederick L Lagman (57) ABSTRACT

A plurality of piles is arranged in frame elements in an axially displaceable manner. Hammers are positioned on the piles. After driving of the piles into a seabed, the hammers are connected to the frame elements, wherein the frame elements together with the hammers are lifted to the surface of the water and to the seaborne vessel by a crane.

12 Claims, 8 Drawing Sheets

METHOD AND DEVICE FOR DRIVING A MULTIPLICITY OF PILES INTO A SEABED

CROSS REFERENCE TO RELATED APPLICATIONS

This application claims priority of European Patent Office Application No. 11183464.4 EP filed Sep. 30, 2011. All of the applications are incorporated by reference herein in their entirety.

FIELD OF INVENTION

A method and a device for driving a multiplicity of piles into a seabed are provided.

BACKGROUND OF INVENTION

For offshore wind power systems, a firm connection of the wind power system to the seabed is required. Steel lattice constructions which rest on piles driven into the seabed are readily used. This takes place by means of pile-drivers or hammers, e.g. IHC-hammers. Such a hammer is known from the brochure "Menck-Hydraulic Hammers" of the company MENCK GmbH. The hammer is mounted on the individual piles and put into operation, by means of which one pile after the other is driven into the seabed. After the first pile has been hammered in, the hammer is raised and once again positioned on the top of the further pile to be hammered in, which is time-consuming in the case of great sea depth. A pile is for example embodied as a cylindrical pipe, which can taper at its tip.

SUMMARY OF INVENTION

It is an object to provide a device for driving a multiplicity of piles into the seabed, which operates in a rapid and cost-effective manner.

The object is achieved by the features of the independent claims. Advantageous embodiments and developments are listed in the dependent claims.

In the method for driving a multiplicity of pipes or piles into the seabed the following method steps are performed:
a) introducing and fixing the piles at their seabed-side end area in frame elements of a frame,
b) attaching hammers to the seabed-side end areas of the piles,
c) lowering the frame with the piles towards the seabed,
d) hammering or driving the piles into the seabed by the hammers,
e) lying, contacting, attaching, latching or hooking-up the hammers onto or into the frame elements after the piles have been hammered into the seabed,
f) raising the frame with the hammers to the surface.

The hammers are attached on the top side of the piles as the frame is lowered to a suitable position.

With this method, a rapid driving of a plurality of piles into the seabed is provided. Only after once being lowered to the seabed and raised to the surface in one step, the hammers and the frame are rapidly available for further driving-in processes.

After the introduction and positioning of the piles into the frame elements, the frame with the piles is lowered from the surface at least partially in the direction of the seabed.

The hammering or driving-in of a plurality or multiplicity of piles into the seabed is performed in parallel.

The laying, contacting, attaching, latching or hooking-up of the hammers to the frame elements takes place by mutually corresponding form-fitted or force-fitted connecting elements or coupling elements at the ends of the hammers and the frame elements facing each other, wherein a secure lifting of the frame with the hammers is provided.

A plurality of frame elements is provided at a prescribed distance from each other, so that the piles may be driven into the seabed in a prescribed geometry.

The frame, the piles and the hammers are stored on a seaborne vessel, conveyed from this to the planned position on seabed or hammering position, and there hammered into the seabed according to the aforementioned method, wherein piles for a multiplicity (plurality) of foundation positions or WTG (Wind Turbine Generator) positions are stored on the seaborne vessel.

A wind turbine substructure, e.g. a steel lattice construction is positioned on the piles via lances, and connected by cementing or pointing.

A device for driving a multiplicity of pipes or piles into the seabed a frame is provided, wherein cylindrically frame elements and a multiplicity of piles may be guided and shifted into place, while held at a prescribed drilling, hammering or pile distance and in an axial direction. Here, a multiplicity of hammers or pile-drivers are provided, wherein each hammer is arranged on an end area of a pile facing away from the seabed, wherein the frame-side ends of the hammers and the hammer-side ends of the frame elements have mutually corresponding, mechanically complementary connecting or coupling elements, so that, after the driving-in of the piles into the seabed, the hammers rest in such a stable manner on the frame elements, that the frame together with the hammers lying on the frame elements may be raised from the seabed to the surface of the water and to the board of the seaborne vessel.

The frame may be lowered to the seabed and raised to the surface again by winches arranged on a seaborne vessel.

The coupling element of the hammer has a frustoconical or conical outer surface, which may be set positively on a corresponding frustoconical inner surface of the coupling element of the frame element.

On its face, the coupling element of the hammer has a shape embodied as grooves, which may be connected in a form-fitted manner to a form of the face of the coupling element embodied as pins.

On its face, the coupling element of the hammer may be connected to the face of the coupling element by the gravitational force of the hammer, or a force-fitted connection.

The frame may preferably be conveyed between the surface and the seabed by a winch arranged on a seaborne vessel.

BRIEF DESCRIPTION OF THE DRAWINGS

Further embodiments and developments are represented in the figures.

DETAILED DESCRIPTION OF INVENTION

In the following, components of the devices which have the same function are indicated by the same reference character.

Figure 1:
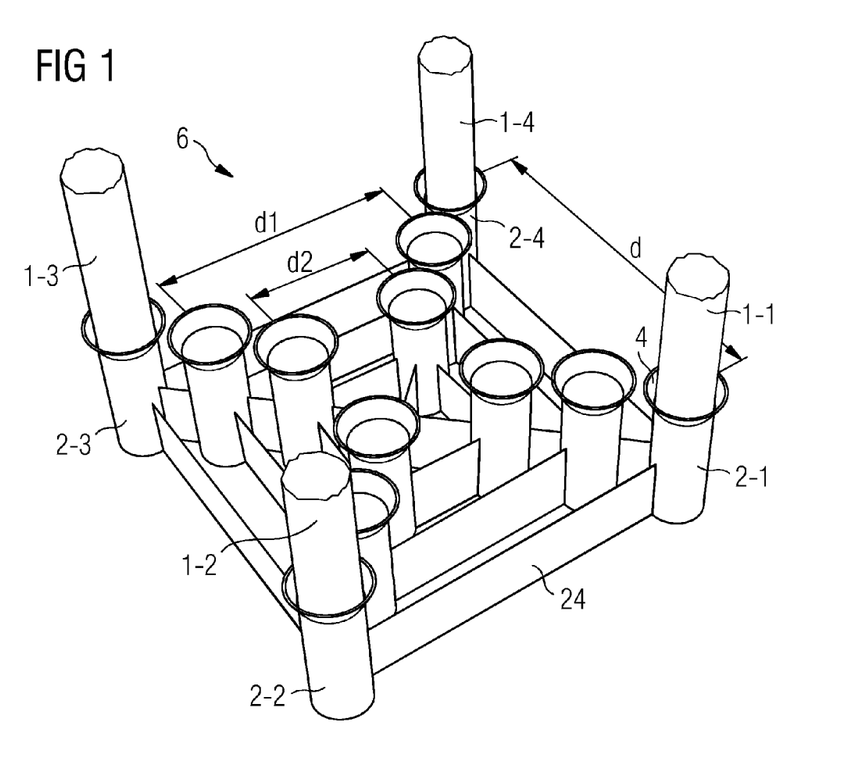
FIG. 1 shows a frame for the guidance of piles into frame elements in an oblique 3D view.

FIG. 1 shows a frame 6 with frame elements 2-1, 2-2, 2-3 and 2-4 obliquely from above in a 3D view. The frame elements are essentially embodied in cylindrical form in each case with a frustoconical guide attachment 4. The frame elements 2-1, 2-2, 2-3, 2-4 serve to accept and guide piles 1-1, 1-2, 1-3 and 1-4 in their axial direction. The frame elements 2-1, 2-2, 2-3 and 2-4 are interconnected in a rigid and stable manner by spacers 24. The corners of four frame elements 2-1, 2-2, 2-3 and 2-4 form a square with sides of length d. Alternatively, the frame may also be of triangular or other shapes, according to the shape of the requested substructure of the wind turbine tower.

In the present case, each frame element 2-1, 2-2, 2-3 and 2-4 is provided three times (in total twelve frame elements), so that three squares, each with four corner points, are arranged within each other. The frame elements 2-1, 2-2, 2-3 and 2-4 have distances d2, d1, d (or lateral lengths d2, d1, d) from each other, wherein d2 is the smallest distance and d is the greatest distance between frame elements. Other geometries for the frame elements are also conceivable, for example in the form of rectangles or other polygons.

The frame 6 serves as a template for the piles 1, which are being driven into the seabed 11 as shown in the subsequent figures. Different geometries may be realized in the drilling field on the seabed 11 with one frame 6. Here, the frame 6, together with the piles 1-1, 1-2, 1-3 and 1-4 guided into frame elements 2-1, 2-2, 2-3 and 2-4, is positioned on the seabed 11 (see for example FIG. 4). The frame 6 holds the piles 1-1, 1-2, 1-3 and 1-4 in position for hammering. The piles are not fixed in the vertical degree of freedom. The piles 1-1, 1-2, 1-3 and 1-4 are driven into the seabed 11 by a hammer 3 as will be described in greater detail below.

Figure 2:
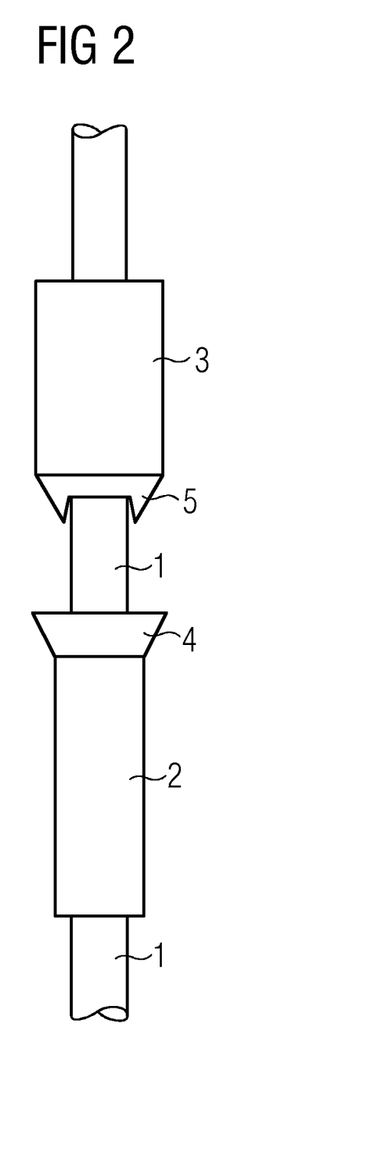
FIG. 2 shows a pile guided in a frame element with a hammer in a side view.

FIG. 2 shows a frame element 2 of a frame 6, into which a pile 1 is inserted, guided in its axial direction. Arranged on the pile 1 is a hammer 3 for driving the pile 1 into the seabed 11 (see for example FIG. 4). After driving the pile 1 into the seabed 11, the hammer 3 rests on the guide attachment 4 of the frame element 2.

On side of the hammer 3 assigned to the frame element 2 comprises a frustoconical outer surface 5, which abuts or engages into a corresponding frustoconically extending inner surface of the hammer-side guide attachment 4 of the frame element 2.

Because of the great weight of the hammer 3 and/or because of the form-fitted frustoconical shape of the coupling elements 4 and 5, the hammer 3 rests on the frame element 2 in such a stable manner that the frame 6 with all the hammers 3 lying on the frame elements 2 may be conveyed from the seabed 11 to the surface of the water and the seaborne vessel 13 by a winch 23 attached to each frame element 2.

Figure 3:
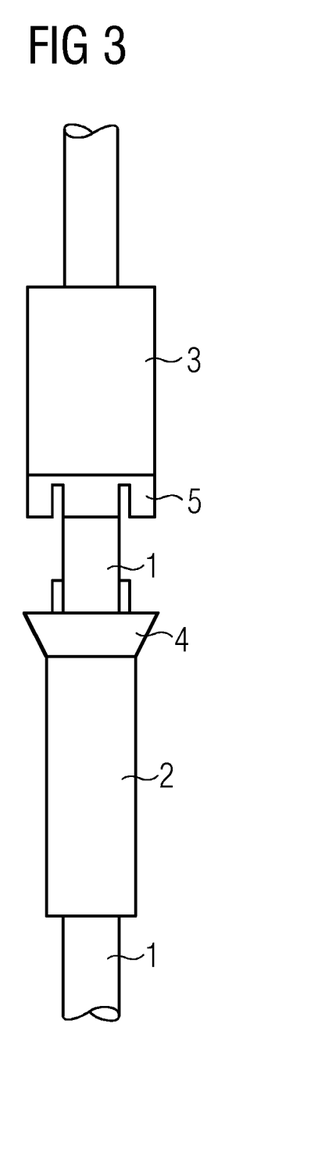
FIG. 3 shows a further exemplary embodiment of a pile guided in a frame element with a hammer from FIG. 2.

FIG. 3 represents the device from FIG. 2 in a side view with alternative coupling elements 4 and 5 of the hammer 3 and of the frame element 2, wherein the coupling element 5 of the hammer 3 represents an attachment 5 in cylindrical form, which has circumferential, evenly-spaced transverse grooves. The coupling element 4 of the frame element 2 has pins, which are embodied in complementary form to the grooves of the coupling element 5 of the hammer 3 and thus achieve a stable connection after positioning of the hammer 3 on the frame element 2.

Alternatively (not shown), the attachment 5 of the coupling element is embodied in conical form, matching the conical embodiment of the coupling element 4 of the frame element 2.

The FIGS. 4 to 8a represent a device for driving a multiplicity of piles 1-1, 1-2, 1-3 and 1-4 into the seabed 11 in successive manufacturing states.

Figure 4:
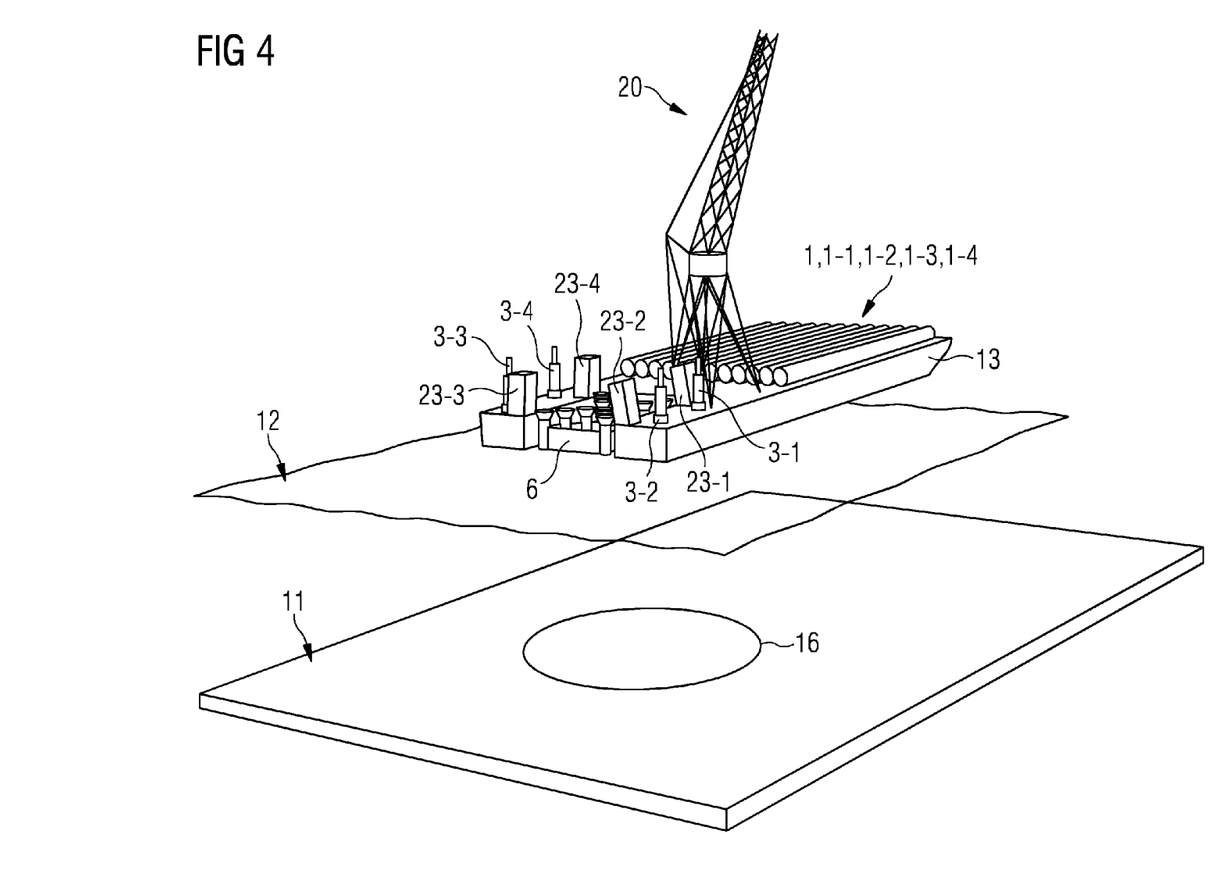
FIG. 4 shows a device for driving piles into the seabed before the first method step.

FIG. 4 represents a device for driving piles 1-1, 1-2, 1-3 and 1-4 into the seabed 11. A seaborne vessel 13 is moored in a fixed position over the selected position on seabed 16, also called hammering position 16, of the seabed 11. Stored on the seaborne vessel 13 are winches 23-1, 23-2, 23-3, 23-4, piles 1, 1-1, 1-2, 1-3, 1-4, a frame 6, a crane 20 and hammers 3-1, 3-2, 3-3, 3-4.

The seaborne vessel 13 floats on the surface 12. The seaborne vessel 13 contains all parts necessary for the pile-driving process, and may reach any point on the surface through the use of powerful engines, in order to be able to halt in the target area exactly over the position on seabed 16, also called drilling field 16, in order to form a precisely positioned and stable drilling platform.

Figure 5:
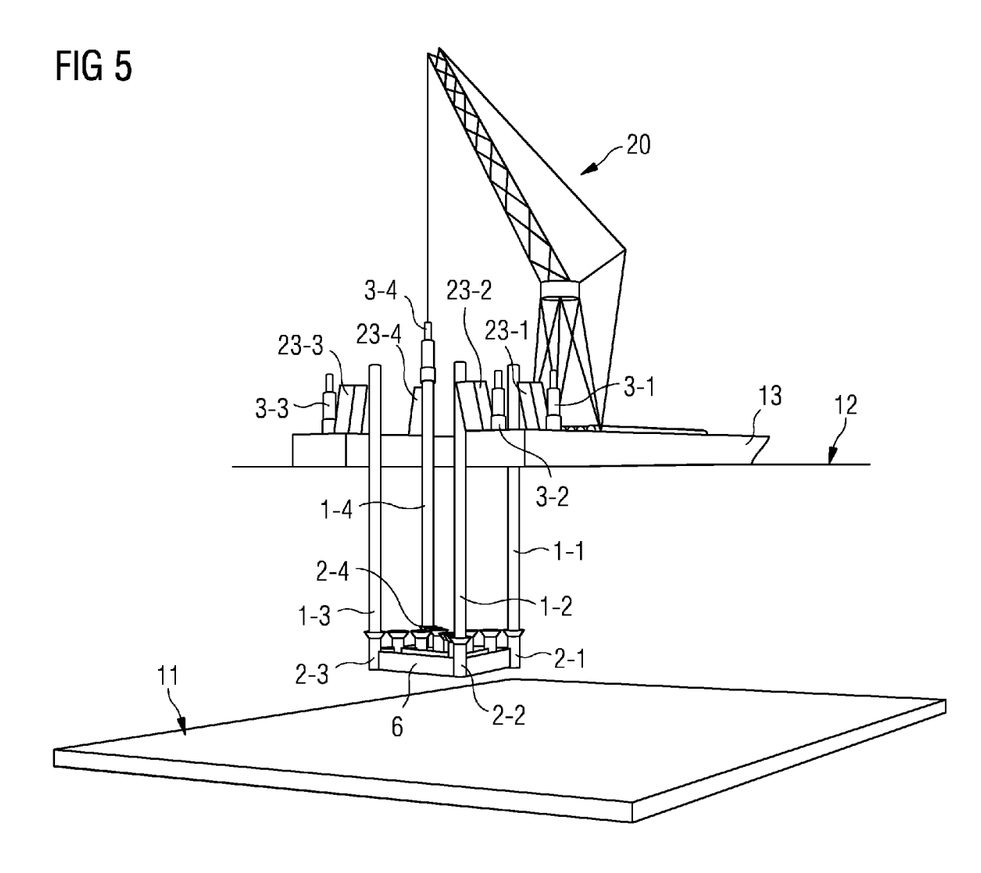
FIG. 5 shows the device for driving piles into the seabed after the first method step.

FIG. 5 shows the device from FIG. 4 in a first method step. The frame elements 2-1, 2-2, 2-3, 2-4 of the frame 6 have been provided and fixed with the four piles 1-1, 1-2, 1-3, 1-4 to be driven into the seabed 11. Alternatively, often three piles or sometimes five piles are used. The frame 6, together with the piles 1-1, 1-2, 1-3, 1-4, attached to the frame elements 2-1, 2-2, 2-3, 2-4, is lowered by the winches 23-1, 23-2, 23-3, 23-4 so far that the crane 20 arranged on the seaborne vessel 13 positions the respective hammers 3-1, 3-2, 3-3, 3-4 successively on the ends of the piles 1-1, 1-2, 1-3, 1-4 facing away from the frame 6. Winches 23-1, 23-2, 23-3, 23-4 and the crane 20 are here anchored in a stable manner onto the seaborne vessel 13. Alternatively, the crane may also be integrated on the vessel.

Figure 6:
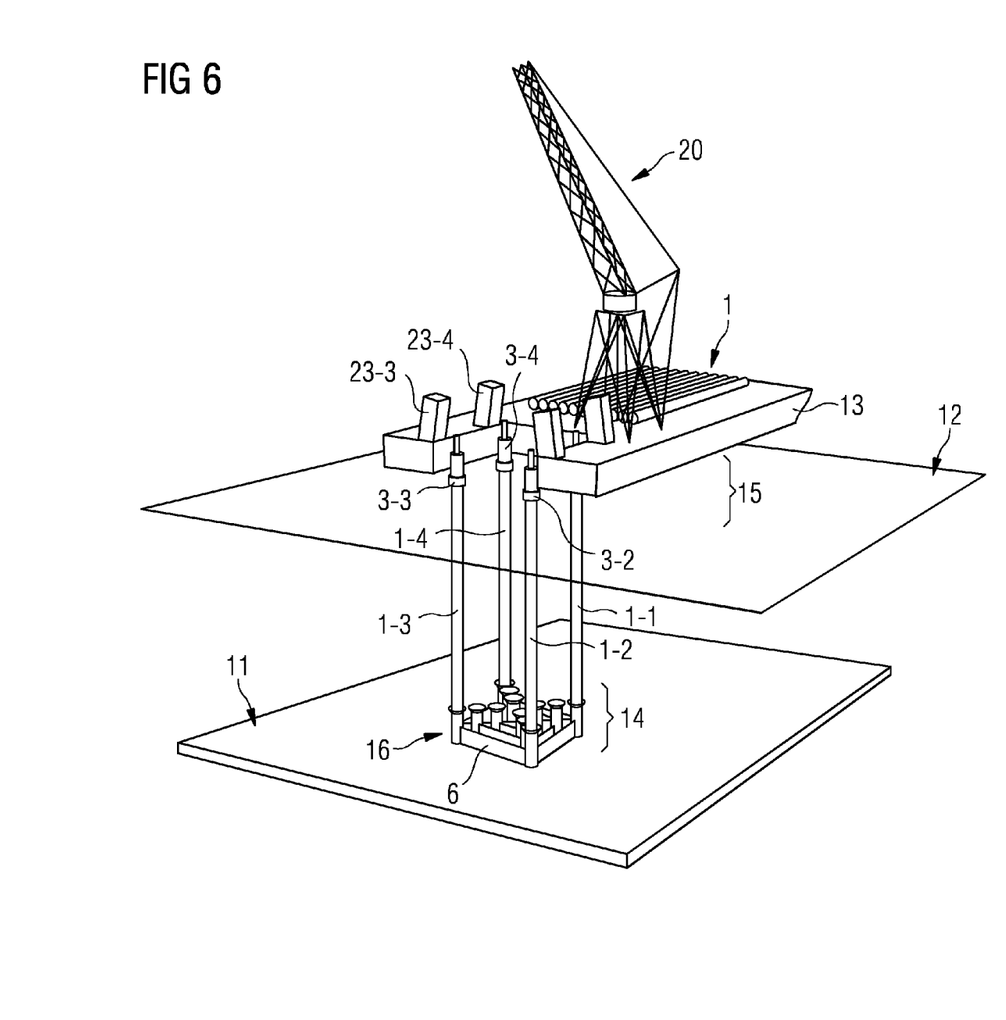
FIG. 6 shows the device for driving piles into the seabed after the second method step.

After attaching hammers 3-1, 3-2, 3-3, 3-4 to the piles 1-1, 1-2, 1-3, 1-4, the frame 6, the piles 1-1, 1-2, 1-3, 1-4 and the hammers 3-1, 3-2, 3-3, 3-4 are lowered on the winches 23-1, 23-2, 23-3, 23-4 in the desired drilling field 16 on the seabed 11, as shown in FIG. 6. The frame 6 is anchored to the seabed 11 in a stable manner. Usually, the gravity of the frame 6 is sufficient for anchoring the frame 6.

The hammers 3-1, 3-2, 3-3, 3-4 are now actuated, so that the piles 1-1, 1-2, 1-3, 1-4 are driven with a given velocity into the seabed 11. With the frame 6, the four piles 1-1, 1-2, 1-3, 1-4 are driven into the seabed 11 with the prescribed distance d (see for example FIG. 1) of the frame elements 2-1, 2-2, 2-3, 2-4, which are spaced accordingly relative to each other.

Figure 7:
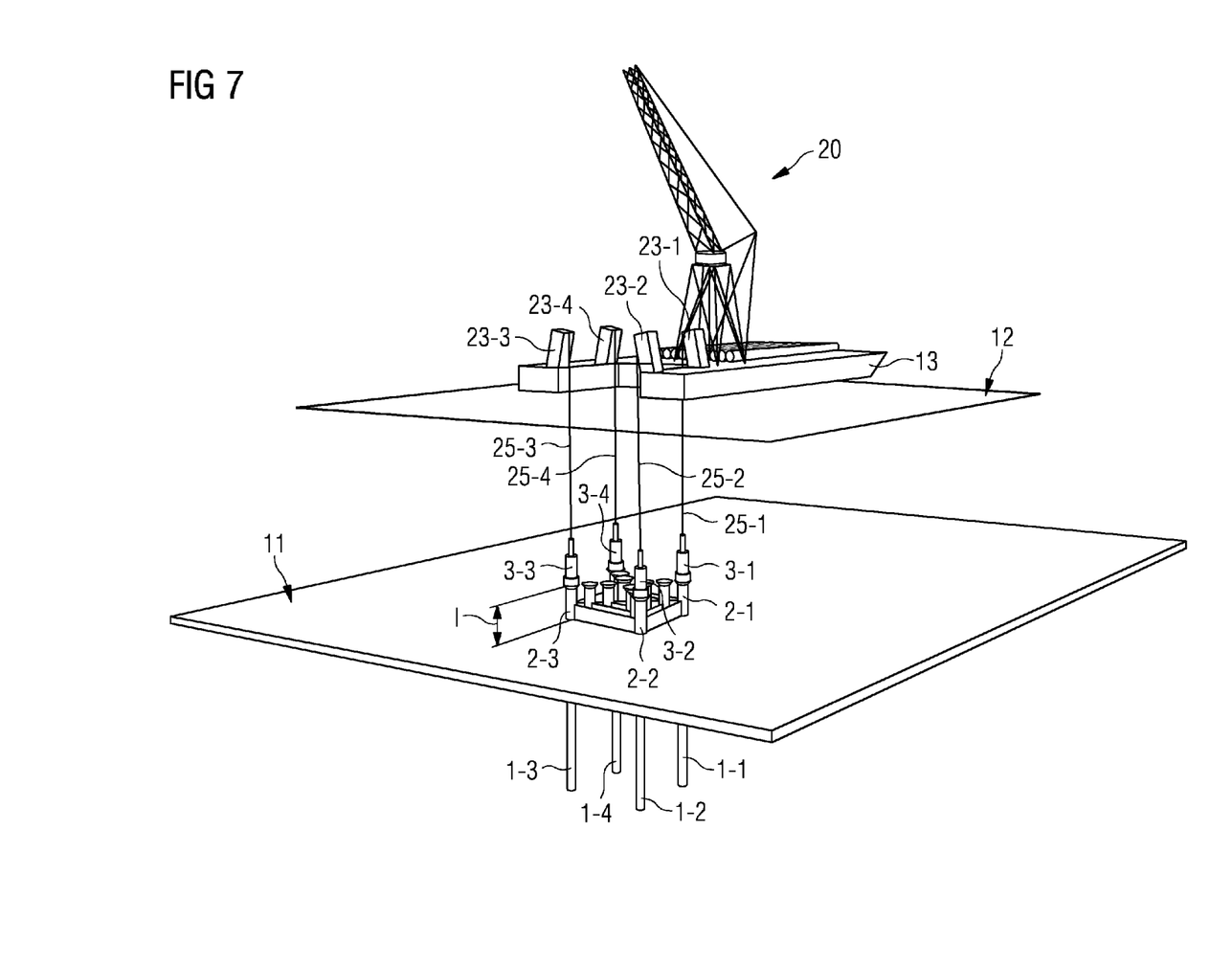
FIG. 7 shows the device for driving a pile into the seabed after the third method step.

The pile-driving process, which is the operation of the hammers 3-1, 3-2, 3-3, 3-4, is halted (stopped) when the hammers 3-1, 3-2, 3-3, 3-4 have come into proximity or contact with the frame elements 2-1, 2-2, 2-3, 2-4, as shown in FIG. 7. The piles 1-1, 1-2, 1-3, 1-4 are now in the seabed 11.

Figure 8A:
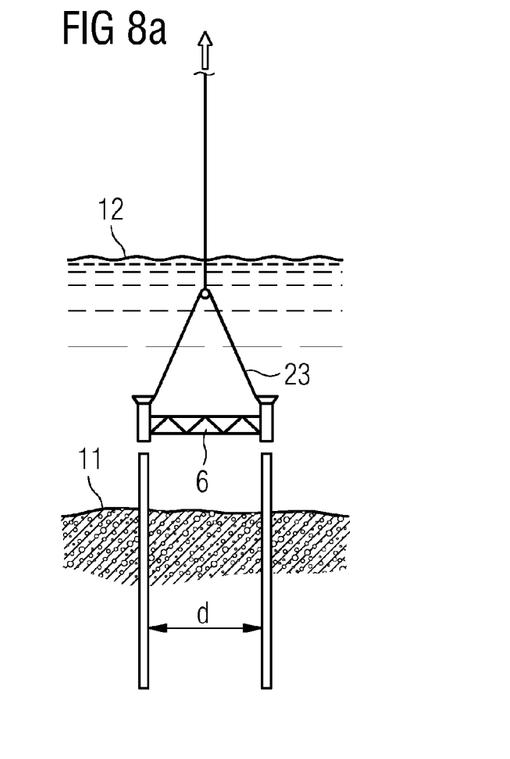
FIGS. 8a and 8b show the device for driving piles into the seabed after the fourth method step.
Figure 8B:
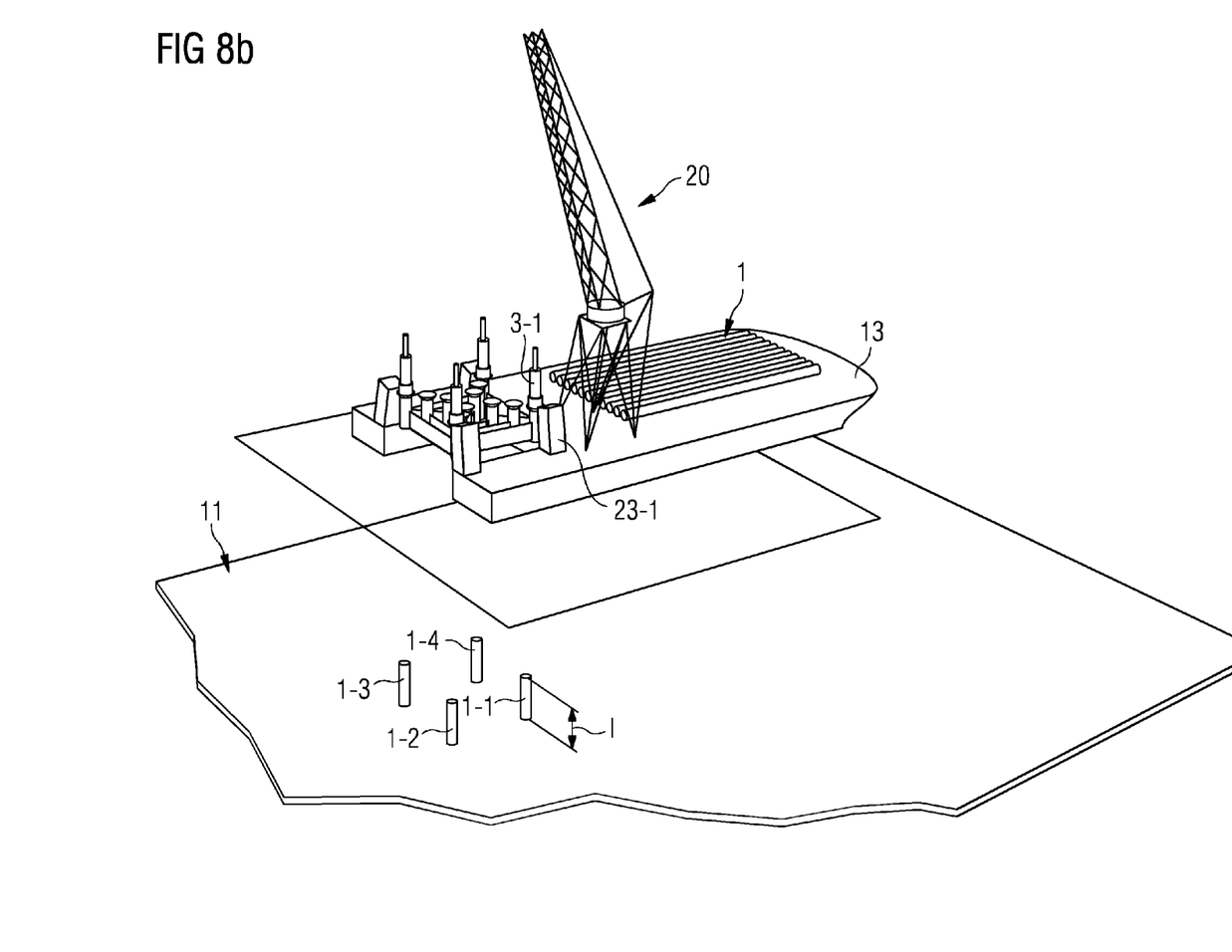

The surface-side ends of the piles 1-1, 1-2, 1-3, 1-4 protrude by a prescribed length l from the seabed 11, as shown in FIG. 8b. The frame elements are now lifted with the winches 23 as shown in schematic form in FIG. 8a.

The frame elements 2-1, 2-2, 2-3, 2-4 and the hammers 3-1, 3-2, 3-3, 3-4 come into contact with each other at the coupling elements 4, 5 shown in the FIG. 2 or 3, and, where applicable, latch into the groove-pin-connection. Now the frame 6 with the hammers 3-1, 3-2, 3-3, 3-4 is raised in a lifting process by the winches 23-1, 23-2, 23-3, 23-4 (FIG. 8a). After lifting of the frame 6 with the hammers 3-1, 3-2, 3-3, 3-4 to the seaborne vessel 13, all tools required for driving piles into the seabed 11 are once more on board the seaborne vessel 13, as shown in FIG. 8b. The hammers 3-1, 3-2, 3-3, 3-4 are now raised from the frame elements 2-1, 2-2, 2-3, 2-4 by the crane 20 and lifted onto the seaborne vessel 13 in the prescribed storage position.

With the method and device as described, in particular by the process performed in parallel or simultaneously of driving a multiplicity of piles 1-1, 1-2, -3, 1-4 into the seabed 11 and the simultaneous raising of the hammers 3-1, 3-2, 3-3, 3-4 lying on the frame 6 in a lifting process, a considerable time-saving may be achieved, which results in a significant cost-saving, as the seaborne vessel 13 is special-purpose craft, operation of which is subject to high hourly costs.

Figure 9:
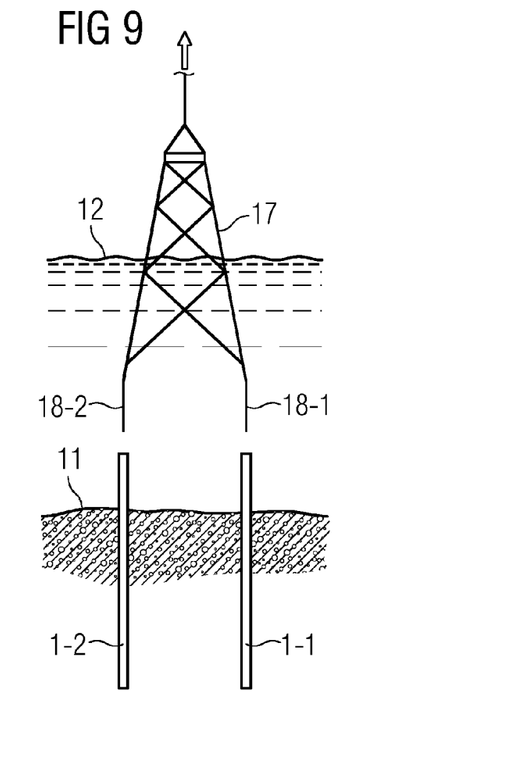
FIG. 9 shows the positioning of a steel lattice construction on the piles.

FIG. 9 shows the first method step for positioning a wind turbine substructure, embodied as a lattice construction 17 made of steel, onto the piles 1-1, 1-2 (and 1-3, 1-4 not shown) driven into the seabed 11. Alternatively, other wind turbine substructures as concrete or shell construction may be used. On the underside of the lattice construction 17, lances 18-1 and 18-2 (and 18-3, 18-4 not shown) are arranged, which are introduced into the cavities of the piles 1-1, 1-2, 1-3 and 1-4.

The lances 18-1, 18-2, 18-3, 18-4 are permanently connected to the piles 1-1, 1-2, 1-3, 1-4 with the aid of a connecting structure, for example by pointing or cementing.

Figure 10:
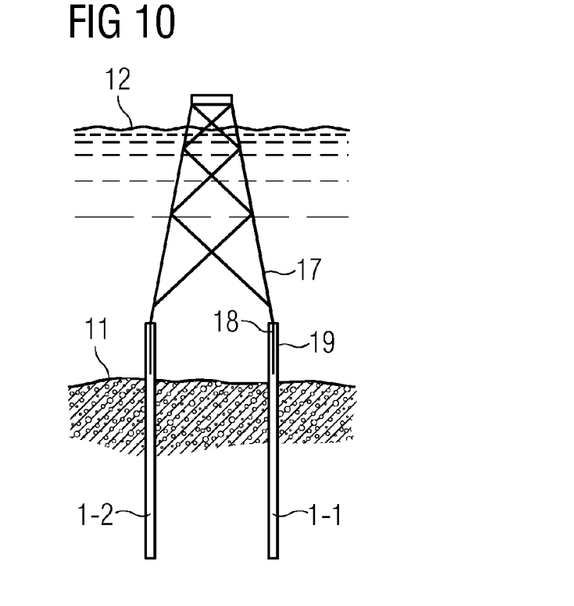
FIG. 10 shows the connection of the steel lattice construction from FIG. 9 to the piles.

FIG. 10 shows the lattice construction 17 in a mounted state on the piles 1-1, 1-2, 1-3 and 1-4. A wind power system (not shown) may now for example be attached to the lattice construction 17.

While specific embodiments have been described in detail, those with ordinary skill in the art will appreciate that various modifications and alternative to those details could be developed in light of the overall teachings of the disclosure. For example, elements described in association with different embodiments may be combined. Accordingly, the particular arrangements disclosed are meant to be illustrative only and should not be construed as limiting the scope of the claims or disclosure, which are to be given the full breadth of the appended claims, and any and all equivalents thereof. It should be noted that the term "comprising" does not exclude other elements or steps and the use of articles "a" or "an" does not exclude a plurality.

The invention claimed is:

1. Method of driving a plurality of piles into a seabed, comprising:
   introducing and fixing piles into frame elements of a frame, wherein one pile is being introduced and fixed into one frame element,
   arranging and fastening hammers on top of the piles, wherein one hammer is being arranged and fastened on top of one pile,
   lowering the frame with the piles towards a seabed,
   driving the piles into the seabed by the hammers,
   attaching each hammer to a frame element by mutually corresponding form-fitted or force-fitted coupling elements after driving the piles into the seabed, and
   lifting the frame with the frame elements and the hammers to the surface.

2. The method as claimed in claim 1, wherein the attaching of the hammers to the frame elements includes lying, contacting, fastening, latching or hooking-up.

3. The method as claimed in claim 1, wherein the driving of the multiplicity of piles into the seabed is performed in parallel and/or simultaneously.

4. The method as claimed in claim 1, wherein the mutually corresponding form-fitted or force-fitted coupling elements are located at respective facing ends of the hammers and the frame elements.

5. The method as claimed in claim 1, wherein a plurality of frame elements is provided at prescribed distances from each other, wherein the piles are driven into the seabed in a prescribed geometry.

6. The method as claimed in claim 1, wherein the frame, the piles and the hammers are stored on a seaborne vessel, and conveyed from the vessel to a planned drilling field and driven into the seabed, wherein piles for a plurality of drilling fields are stored on the seaborne vessel.

7. The method as claimed in claim 1, wherein a lattice construction is positioned on the piles by lances, and cemented or pointed.

8. Device for driving a multiplicity of pipes or piles into a seabed, comprising:
   a frame with frame elements, which are embodied in cylindrical form, for guiding a multiplicity of piles at a prescribed drilling distance,
   a multiplicity of hammers, wherein each hammer is arranged on an end area of a pile facing away from the seabed,
   wherein respective frame-side ends of the hammers and hammer-side ends of the frame elements have mutually corresponding, mechanically complementary form-fitted or force-fitted coupling elements, so that, after the driving of the piles into the seabed, the hammers rest on the respective frame elements in such a stable manner that the frame, together with the hammers resting on the frame elements, are raised from the seabed to the surface of the water.

9. The device as claimed in claim 8, wherein the frame is lowered to the seabed and raised to the surface by a winch arranged on a seaborne vessel.

10. The device as claimed in claim 8, wherein the coupling element of the hammer has a frustoconical outer surface, which is positively positioned on a frustoconical inner surface of the coupling element of the frame element.

11. The device as claimed in claim 8, wherein the coupling elements of the hammers comprise grooves which are connected to pins of the coupling elements of the frame elements in a form-fitted manner.

12. The device as claimed in claim 8, wherein the coupling elements of the hammers are connected face-to-face to the coupling elements of the frame elements by weight of the hammers or a force-fitted connection.

* * * * *